(12) United States Patent
Lee

(10) Patent No.: US 9,601,813 B2
(45) Date of Patent: Mar. 21, 2017

(54) BATTERY PACK

(71) Applicant: SAMSUNG SDI CO., LTD., Yongin-si, Gyeonggi-do (KR)

(72) Inventor: Eunjoong Lee, Yongin-si (KR)

(73) Assignee: Samsung SDI Co., Ltd., Yongin-si (KR)

(*) Notice: Subject to any disclaimer, the term of this patent is extended or adjusted under 35 U.S.C. 154(b) by 22 days.

(21) Appl. No.: 14/706,906

(22) Filed: May 7, 2015

(65) Prior Publication Data

US 2016/0093920 A1 Mar. 31, 2016

(30) Foreign Application Priority Data

Sep. 29, 2014 (KR) .......................... 10-2014-0130325

(51) Int. Cl.
*H01M 10/04* (2006.01)
*H01M 10/42* (2006.01)
*H01M 2/20* (2006.01)
*H01M 10/48* (2006.01)

(52) U.S. Cl.
CPC ........... *H01M 10/425* (2013.01); *H01M 2/20* (2013.01); *H01M 10/48* (2013.01); *H01M 10/486* (2013.01); *H01M 2010/4271* (2013.01)

(58) Field of Classification Search
CPC .. H01M 10/425; H01M 10/48; H01M 10/486; H01M 2010/4271; H01M 2/20
See application file for complete search history.

(56) References Cited

U.S. PATENT DOCUMENTS

| | | | |
|---|---|---|---|
| 2011/0151288 A1* | 6/2011 | Heo | H01M 10/425 429/7 |
| 2012/0052332 A1 | 3/2012 | Ahn | |
| 2012/0270074 A1 | 10/2012 | Koh | |
| 2012/0276419 A1 | 11/2012 | Park | |
| 2014/0037995 A1* | 2/2014 | Lee | H01M 10/4257 429/7 |

FOREIGN PATENT DOCUMENTS

| | | |
|---|---|---|
| KR | 10-2012-0020907 A | 3/2012 |
| KR | 10-2012-0122860 A | 11/2012 |
| KR | 10-2012-0123172 A | 11/2012 |

* cited by examiner

*Primary Examiner* — Emily Le
*Assistant Examiner* — Monique Wills
(74) *Attorney, Agent, or Firm* — Lewis Roca Rothgerber Christie LLP

(57) ABSTRACT

A battery pack includes a battery cell having an electrode tab and a protective circuit module electrically connected to the electrode tab. The protective circuit module has a first surface in an assembling direction of the electrode tab and a second surface opposite the first surface. The electrode tab is separated from the first surface. Therefore, the battery pack has an improved connection structure between the battery cell and the protective circuit module, and short circuits can be prevented or substantially prevented.

8 Claims, 8 Drawing Sheets

BATTERY PACK

CROSS-REFERENCE TO RELATED APPLICATION

This application claims priority to and the benefit of Korean Patent Application No. 10-2014-0130325, filed on Sep. 29, 2014, in the Korean Intellectual Property Office, the entire content of which is incorporated herein by reference.

BACKGROUND

1. Field

Aspects of one or more embodiments relate to a battery pack.

2. Description of the Related Art

Along with the development of wireless Internet and communication technology, the use of portable computers such as tablet personal computers (PCs) or laptop computers equipped with batteries instead of other power supplies has become widespread. Portable computers are small, easy-to-carry, and optimized in terms of mobility, and thus are widely used for business and personal use.

Portable computers including built-in battery packs may be freely used even when a power outlet is not available. A battery pack in which many rechargeable battery cells are electrically connected to each other in the form of a module may function as a high-capacity, high-power power supply. In this case, the battery pack may include a protective circuit module for electrically connecting the battery cells and controlling charging and discharging operations of the battery cells.

SUMMARY

Aspects of one or more exemplary embodiments are directed toward a battery pack having an improved connection structure between a battery cell and a protective circuit module for preventing or substantially preventing a short circuit.

Additional aspects will be set forth in or will be apparent from in the description which follows or may be learned by practice of the presented embodiments.

According to one or more exemplary embodiments, a battery pack includes: a battery cell including an electrode tab; and a protective circuit module electrically connected to the electrode tab, the protective circuit module including a first surface in an assembling direction of the electrode tab and a second surface opposite the first surface, wherein the electrode tab is separated from the first surface.

A connection tab may be positioned across a connection slot of the protective circuit module, and the electrode tab may be on and welded to an upper surface of the connection tab when viewed from the assembling direction.

The connection slot may extend inward from an edge of the protective circuit module to a position away from the electrode tab.

The connection slot may define a gap between the first surface of the protective circuit module and the electrode tab.

The connection tab may be bent in a depth direction of the connection slot.

The connection tab may include: wings on both sides of the connection tab and located at peripheral sides of the connection slot; and a support portion between the wings and bent in the depth direction of the connection slot.

The support portion may be at a position separated from the first surface of the protective circuit module in the depth direction of the connection slot, and the electrode tab may be on the support portion.

A connection tab may be positioned across a connection slot of the protective circuit module, and the electrode tab may be on an upper surface of the connection tab, wherein an end portion of the electrode tab may be bent through the connection slot to surround an edge of the connection tab.

A bent portion of the electrode tab may be an innermost portion of the electrode tab in a direction toward the interior of the protective circuit module, and the connection slot may define a gap between the bent portion of the electrode tab and the first surface of the protective circuit module.

BRIEF DESCRIPTION OF THE DRAWINGS

These and/or other aspects will become apparent and more readily appreciated from the following description of the exemplary embodiments, taken in conjunction with the accompanying drawings in which.

DETAILED DESCRIPTION

Figure 1:
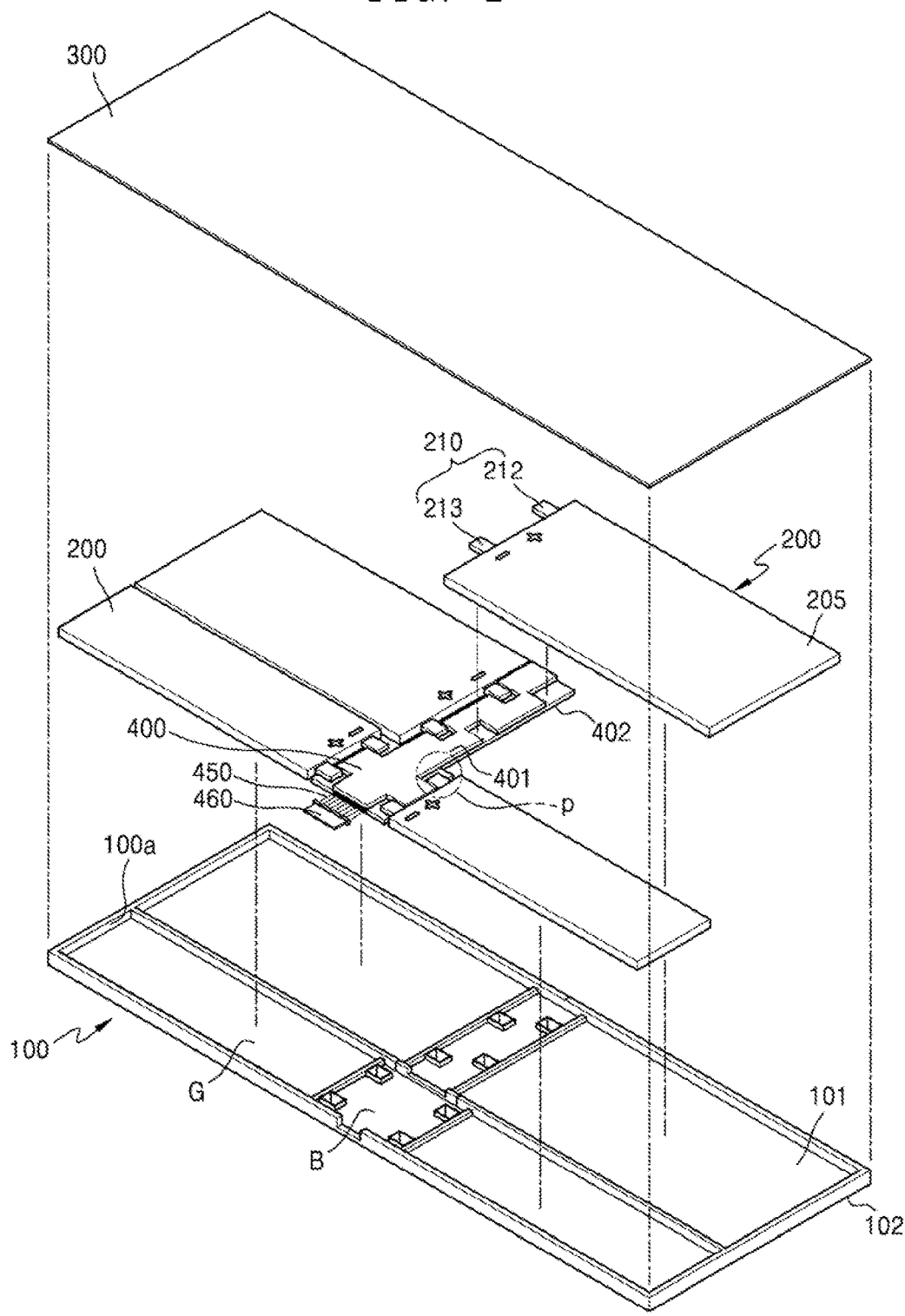
FIG. 1 is an exploded perspective view illustrating a battery pack according to an exemplary embodiment.

Reference will now be made in detail to exemplary embodiments, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects of the present description. As used herein, the term "and/or" includes any and all combinations of one or more of the associated listed items.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section, without departing from the spirit and scope of the inventive concept.

Expressions such as "at least one of," when preceding a list of elements, modify the entire list of elements and do not modify the individual elements of the list. Further, the use of "may" when describing embodiments of the present invention refers to "one or more embodiments of the present invention."

When a first element is described as being "coupled" or "connected" to a second element, the first element may be directly "coupled" or "connected" to the second element, or one or more other intervening elements may be located between the first element and the second element.

Spatially relative terms, such as "beneath", "below", "lower", "downward", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

A battery pack will now be described in detail with reference to the accompanying drawings, in which exemplary embodiments are shown.

FIG. 1 is an exploded perspective view illustrating a battery pack according to an exemplary embodiment.

Referring to FIG. 1, the battery pack includes battery cells 200, a frame 100 supporting the battery cells 200, and a protective circuit module 400 supported on the frame 100 together with the battery cells 200 and controlling charging and discharging operations of the battery cells 200.

Each of the battery cells 200 may include an electrode assembly and a pouch 205 sealing the electrode assembly. For example, the electrode assembly may be manufactured by forming a stack including a positive electrode plate coated with a positive electrode active material, a negative electrode plate coated with a negative electrode active material, and a separator between the positive and negative electrode plates, and winding the stack in the form of a jelly roll. Alternatively, the electrode assembly may be manufactured by repeatedly stacking a positive electrode plate, a separator, and a negative electrode plate.

First and second electrode tabs 212 and 213 having different polarities may be connected to the electrode assembly. The first and second electrode tabs 212 and 213 may protrude outward through a side of the battery cell 200 and be electrically connected to the protective circuit module 400, as described later. In the present disclosure, the first and second electrode tabs 212 and 213 may be collectively referred to as an electrode tab 210. For example, the electrode tab 210 may be referred to as a term including one of the first and second electrode tabs 212 and 213 or both of the first and second electrode tabs 212 and 213.

The battery cells 200 may be electrically connected in series, parallel, or series-parallel through the protective circuit module 400. The battery cells 200 may be electrically connected as a module by the protective circuit module 400.

For example, the first and second electrode tabs 212 and 213 may be formed on a side of each of the battery cells 200. In this case, the protective circuit module 400 may extend across the sides of the battery cells 200 and may be electrically connected to the first and second electrode tabs 212 and 213 of the battery cells 200 neighboring each other.

In the embodiment shown in FIG. 1, two battery cells 200 may be paired, and the battery cells 200 may be arranged in such a manner that the electrode tabs 210 of each pair of the battery cells 200 may face the electrode tabs 210 of the other pair of battery cells 200.

In another embodiment, the battery cells 200 may be arranged in parallel with each other, and the first and second electrode tabs 212 and 213 may extend in parallel with each other from the battery cells 200 to a side of the protective circuit module 400.

The protective circuit module 400 may measure state variables such as temperatures, voltages, or currents of the battery cells 200 for monitoring the operations of the battery cells 200 and may function as a control unit for controlling charging and discharging operations of the battery cells 200 based on results of the monitored variables.

For example, a discharge current collected from the battery cells 200 may be input to the protective circuit module 400 and then may be supplied to an external device. For this, a connector 450 may be connected to the protective circuit module 400 for electric connection to the external device. For example, the connector 450 may include a plurality of connection lines.

For example, the battery pack may be included in the external device as a power supply and may be electrically connected to the external device through the connector 450 which includes the connection lines for signal and power transmission. An electrical connector 460 may be provided at an end of the connector 450 for electric connection to the external device.

The frame 100 forms an overall framework of the battery pack and supports the battery cells 200 and the protective circuit module 400. The frame 100 may be a member capable of supporting two or more battery cells 200.

Cell rests G may be formed in the frame 100 for accommodating the battery cells 200. The cell rests G may have a recess shape and may define installation positions of the battery cells 200. For example, the cell rests G may define the installation positions of the battery cells 200 together with barrier walls 100a formed along edges of the frame 100 to surround the cell rests G. The cell rests G may have a recess shape corresponding to the shape of the battery cells 200.

A circuit rest B may be formed in the frame 100 for accommodating the protective circuit module 400. The circuit rest B may have a recess shape corresponding to the shape of the protective circuit module 400.

For example, the circuit rest B may be formed approximately (or about) in the middle of the frame 100, and the cell rests G may be formed on both sides of the circuit rest B. Since the protective circuit module 400 is electrically connected to the battery cells 200, if the protective circuit module 400 is at a center position, electric connection passages may be shortened.

The cell rests G and the circuit rest B may be separated from each other by barrier walls 100a extending across the frame 100, and the battery cells 200 and the protective circuit module 400 accommodated in the cell rests G and the circuit rest B may be electrically connected to each other without mechanically interfering with neighboring structures.

Reinforcing parts may be formed on the frame 100. The reinforcing parts may include a plurality of ribs. For example, the reinforcing parts may include a plurality of parallel ribs extending on the frame 100 in one direction. Owing to the reinforcing parts, although the weight of the frame 100 is reduced, the frame 100 may have a sufficient degree of mechanical rigidity for resisting bending or twisting.

For example, the barrier walls 100a defining the cell rests G and the circuit rest B may extend along the edges of the frame 100 or across the frame 100 and thus may function as reinforcing parts improving the mechanical strength of the frame 100. The frame 100 may be formed of an insulative resin by an injection molding method. However, the present invention is not limited thereto.

The frame 100 may include a first surface 101 and a second surface 102. For example, the battery cells 200 and the protective circuit module 400 may be coupled to the first surface 101 of the frame 100. For example, the first and second surfaces 101 and 102 refer to main surfaces of the frame 100 and may occupy the largest areas of the frame 100 having an approximately (or about) rectangular parallelepiped shape.

The battery pack illustrated in FIG. 1 as an example may include an insulation plate 300 to cover the first surface 101 of the frame 100. The insulation plate 300 may cover the first surface 101 of the frame 100 so that the battery cells 200 may not be separated from the frame 100. For example, after the battery cells 200 are on the frame 100, the insulation plate 300 may cover the battery cells 200 to prevent or substantially prevent separation of the battery cells 200. The positions of the battery cells 200 on the frame 100 may be securely fixed owing to the insulation plate 300 above the first surface 101 of the frame 100.

The insulation plate 300 may be coupled to or bonded to the frame 100. The insulation plate 300 may be formed in a plate shape by using an insulative material such as polyethylene terephthalate (PET).

The battery cells 200 are electrically connected to the protective circuit module 400. The battery cells 200 are electrically connected to the protective circuit module 400 through connection structures P.

Figure 2A:
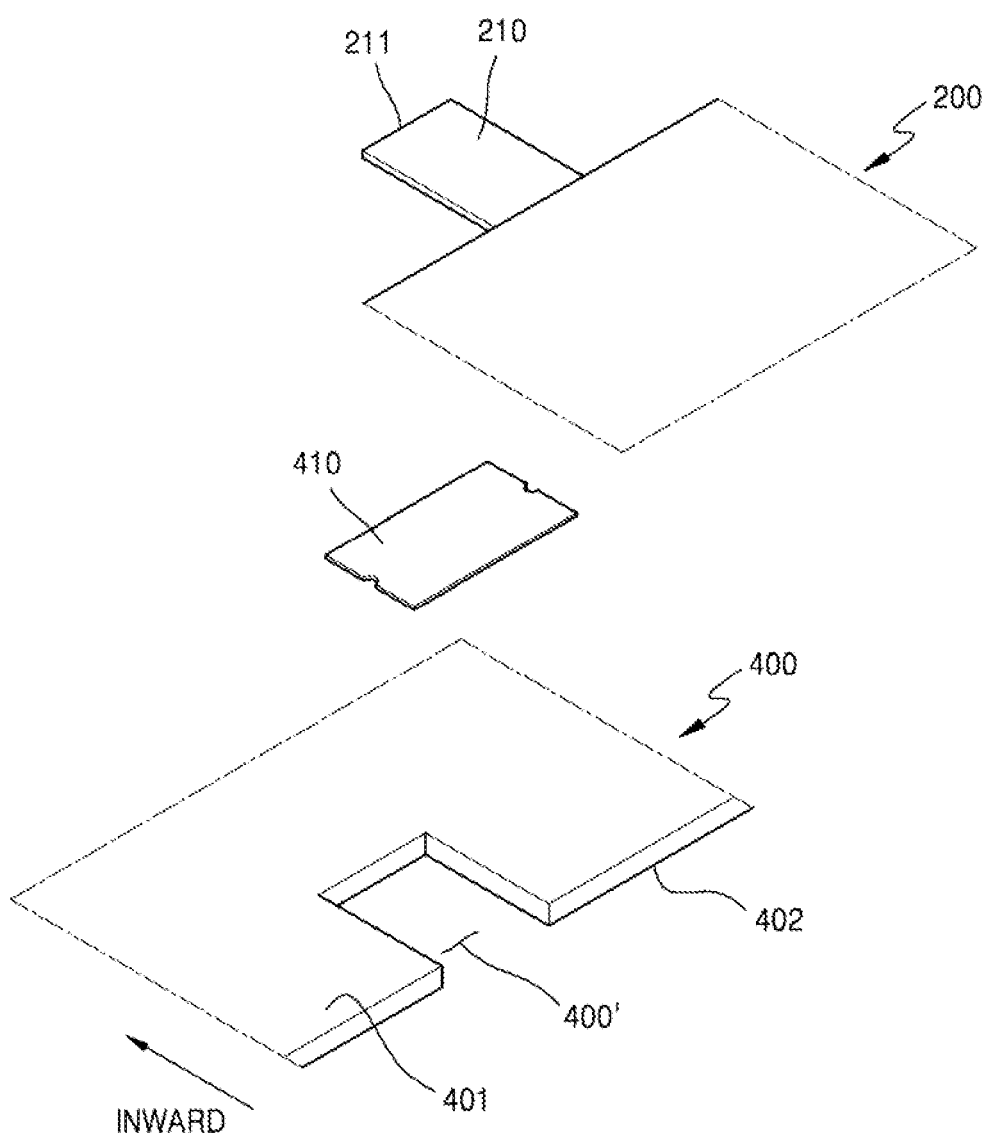
FIGS. 2A and 2B are views illustrating details of a connection structure between a battery cell and a protective circuit module illustrated in FIG. 1.
Figure 2B:
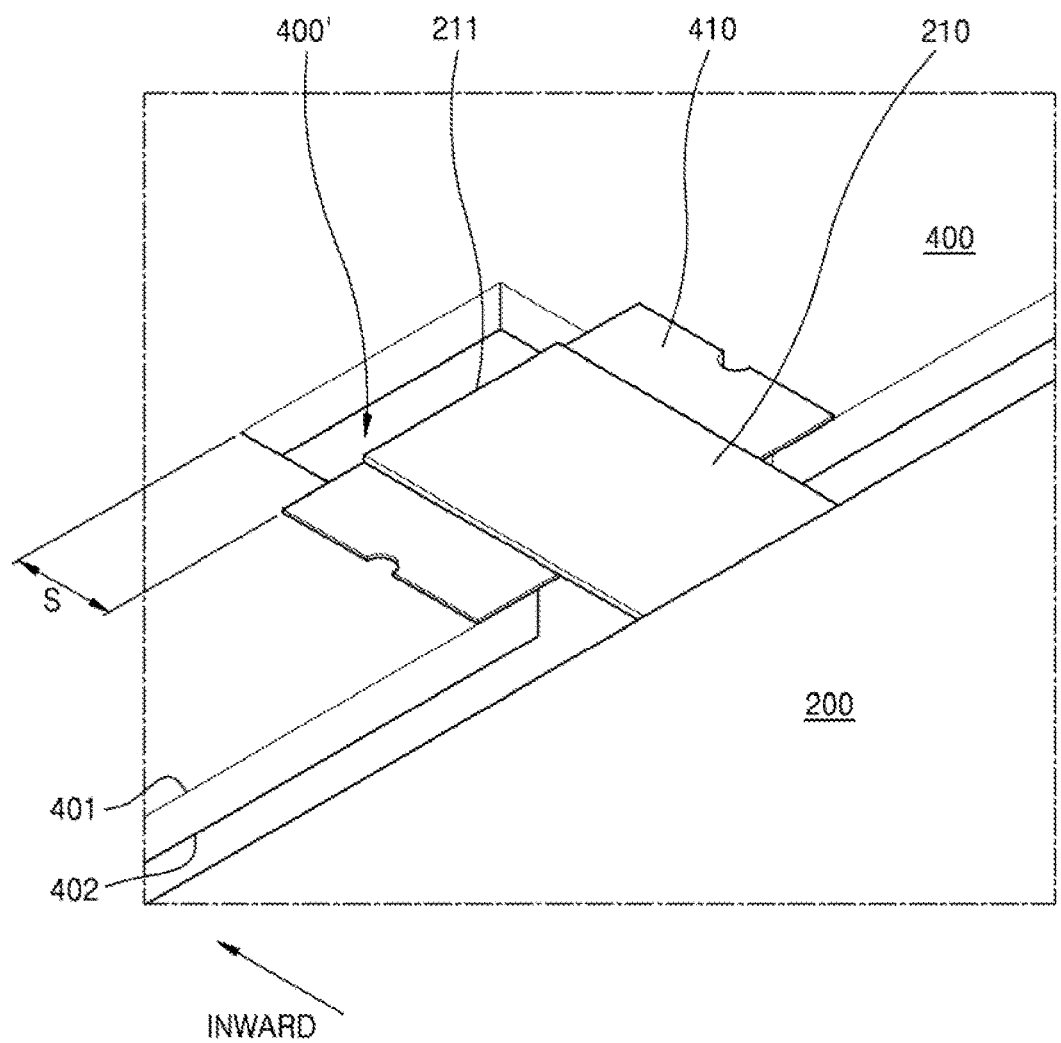

FIGS. 2A and 2B are views illustrating details of the connection structure P between one of the battery cells 200 and the protective circuit module 400 illustrated in FIG. 1. Referring to FIGS. 2A and 2B, the electrode tab 210 of the battery cell 200 is electrically connected to a connection tab 410 of the protective circuit module 400. For example, the electrode tab 210 of the battery cell 200 may be welded to the connection tab 410 of the protective circuit module 400.

In some embodiments, the electrode tab 210 of the battery cell 200 may be placed on the connection tab 410 of the protective circuit module 400 and then may be welded thereto. In this case, the electrode tab 210 of the battery cell 200 and the connection tab 410 of the protective circuit module 400 may be welded together using a welding electrode in an overlapped state. For example, the welding electrode may access welding portions of the electrode tab 210 and the connection tab 410 through upper and lower sides of the connection structure P. In some embodiments, the welding electrode may apply a welding current to an upper surface of the electrode tab 210 and a lower surface of the connection tab 410 exposed through a connection slot 400'.

Since the lower surface of the connection tab 410 is exposed through the connection slot 400', the welding electrode may access the connection tab 410. For example, the connection tab 410 of the protective circuit module 400 may be placed across an upper side of the connection slot 400', and then the electrode tab 210 of the battery cell 200 may be welded to an upper surface of the connection tab 410.

In some embodiments, the connection slot 400' may extend at least to a position away from the electrode tab 210 of the battery cell 200. Then, owing to the connection slot 400', a gap S (refer to FIG. 2B) may be formed between the electrode tab 210 and a first surface 401 of the protective circuit module 400 on which various suitable circuit patterns may be arranged.

For example, the protective circuit module 400 may have an approximately (or about) hexahedral shape, and the largest two main surfaces of the protective circuit module 400, that is, upper and lower surfaces thereof, may be referred to as first and second surfaces 401 and 402. When viewed in an assembling direction of the electrode tab 210, that is, when the electrode tab 210 is assembled in a direction toward the upper surface of the protective circuit module 400 as shown in FIG. 2A, the upper surface may be the first surface 401.

The connection slot 400' may extend inward from an end of the protective circuit module 400 in a direction parallel with the electrode tab 210 to a position away from an end 211 of the electrode tab 210. Owing to this structure of the connection slot 400', as described above, a gap S (refer to FIG. 2B) may be formed between the electrode tab 210 and the first surface 401 of the protective circuit module 400 on which various suitable circuit patterns may be arranged, and thus electric contact between the circuit patterns and the electrode tab 210 may be prevented or substantially prevented.

Both the electrode tab 210 of the battery cell 200 and the connection slot 400' may extend toward an inner side (or inner area) of the protective circuit module 400, but the connection slot 400' may further extend to a position away from the end 211 of the electrode tab 210 so that the electrode tab 210 may not make contact with the first surface 401 of the protective circuit module 400, thereby preventing or substantially preventing a short circuit between the electrode tab 210 and the circuit patterns arranged on the first surface 401.

Figure 3:
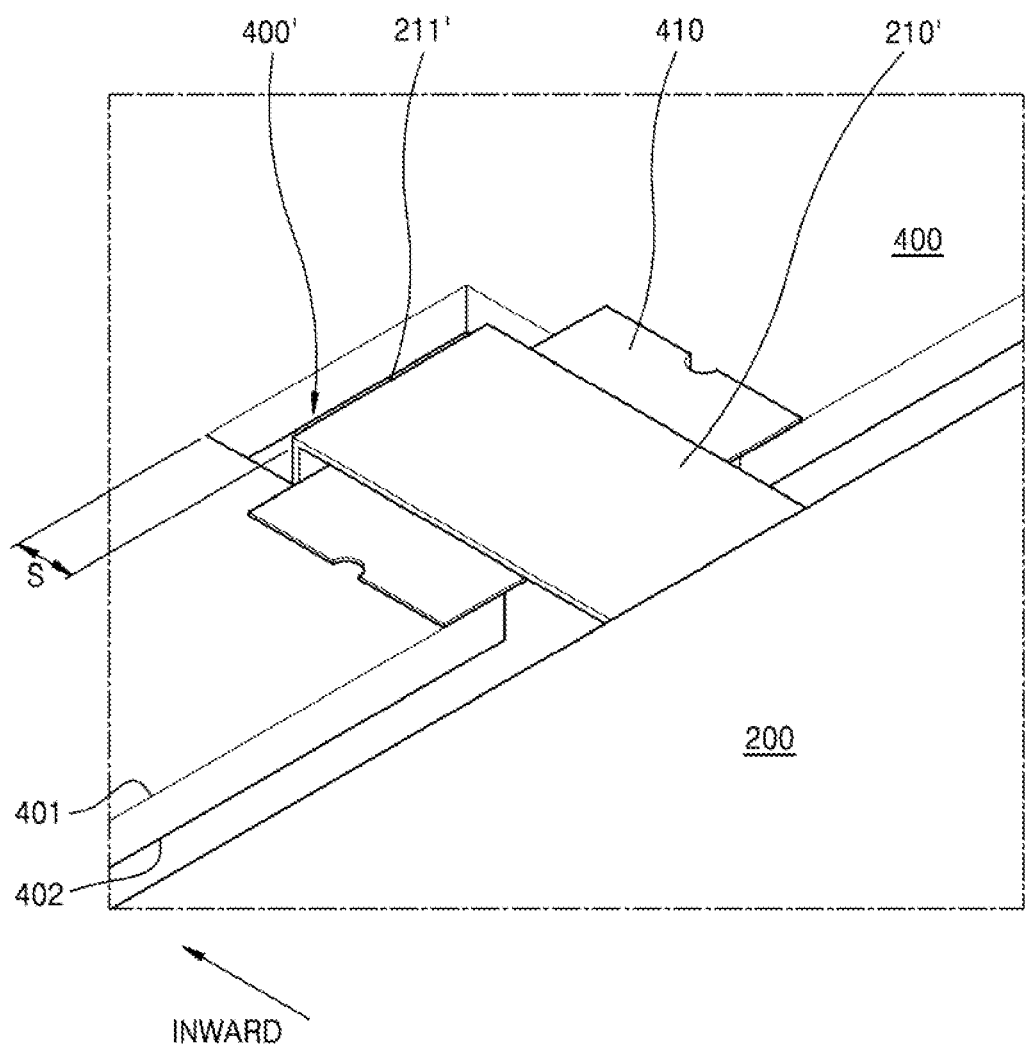
FIG. 3 is a view illustrating a connection structure between a battery cell and a protective circuit module according to another exemplary embodiment.

FIG. 3 is a view illustrating a connection structure between a battery cell 200 and a protective circuit module 400 according to another exemplary embodiment. Referring to FIG. 3, a connection tab 410 may be placed on a connection slot 400' of the protective circuit module 400, and an electrode tab 210' of the battery cell 200 may be welded to an upper surface of the connection tab 410. That is, the connection tab 410 and the electrode tab 210' placed on one another may be welded together. In this case, an end portion of the electrode tab 210' may be bent to surround the connection tab 410.

The end portion of the electrode tab 210' may be bent to surround an edge of the connection tab 410 through the connection slot 400'. Therefore, an innermost end portion 211' of the electrode tab 210' may be separated from a first surface 401 of the protective circuit module 400 with the connection slot 400' therebetween. In some embodiments, the innermost end portion 211' of the electrode tab 210', that is, an end portion of the electrode tab 210' extending to an inner side (or inner area) of the protective circuit module 400, may not be in contact with the first surface 401 of the protective circuit module 400 because the electrode tab 210' is bent, and owing to the connection slot 400', a gap S may be formed therebetween.

Since the innermost end portion 211' of the electrode tab 210' is separated from the first surface 401 of the protective circuit module 400 with the gap S therebetween, the electrode tab 210' may not be short circuited with circuit patterns formed on the first surface 401.

As described with reference to FIGS. 2A and 2B, the connection slot 400' of the protective circuit module 400 of the current embodiment extends to a position away from the electrode tab 210'. That is, both the connection slot 400' of the protective circuit module 400 and the electrode tab 210' of the battery cell 200 extend toward an inner side (or inner area) of the protective circuit module 400, wherein the connection slot 400' extends to a position away from the innermost end portion 211' of the electrode tab 210' of the battery cell 200.

In this case, since the electrode tab 210' of the battery cell 200 is bent, although the connection slot 400' does not extend too much (or does not extend relatively too much), the gap S may be sufficiently formed between the first surface 401 of the protective circuit module 400 and the innermost end portion 211' of the electrode tab 210'. For example, if the electrode tab 210' extends without being bent, the connection slot 400' may need to extend too far (or relatively too far) of a distance in order to be away from the electrode tab 210'.

In the current embodiment, a marginal portion of the electrode tab 210' is bent. Thus, the electrode tab 210' does not extend inwardly too much (or does not extend inwardly relatively too much) and does not make contact with the first surface 401 of the protective circuit module 400 on which the circuit patterns are formed. As a result, a short circuit between the electrode tab 210' and the circuit patterns may be prevented or substantially prevented.

To prevent or substantially prevent a short circuit with the protective circuit module 400 (that is, the circuit patterns formed on the first surface 401 of the protective circuit module 400), the length of the electrode tab 210' may be checked, for example, through a strict process control. In the current embodiment, however, the length of the electrode tab 210' may be checked with a relatively generous margin because the marginal portion of the electrode tab 210' is bent to prevent or substantially prevent the electrode tab 210' from extending too much (or relatively too much). That is, although the length of the electrode tab 210' is not checked through a strict process control, a short circuit between the electrode tab 210' and the protective circuit module 400 may be prevented or substantially prevented.

Figure 4A:
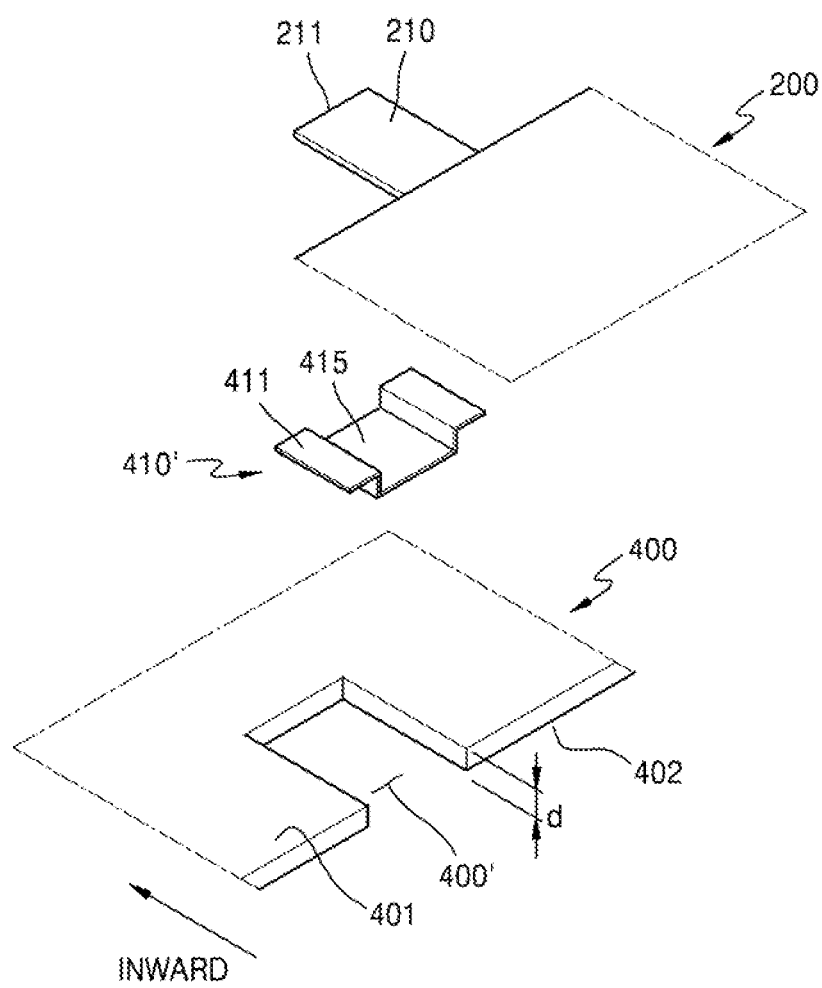
FIGS. 4A and 4B are views illustrating a connection structure between a battery cell and a protective circuit module according to another exemplary embodiment.
Figure 4B:
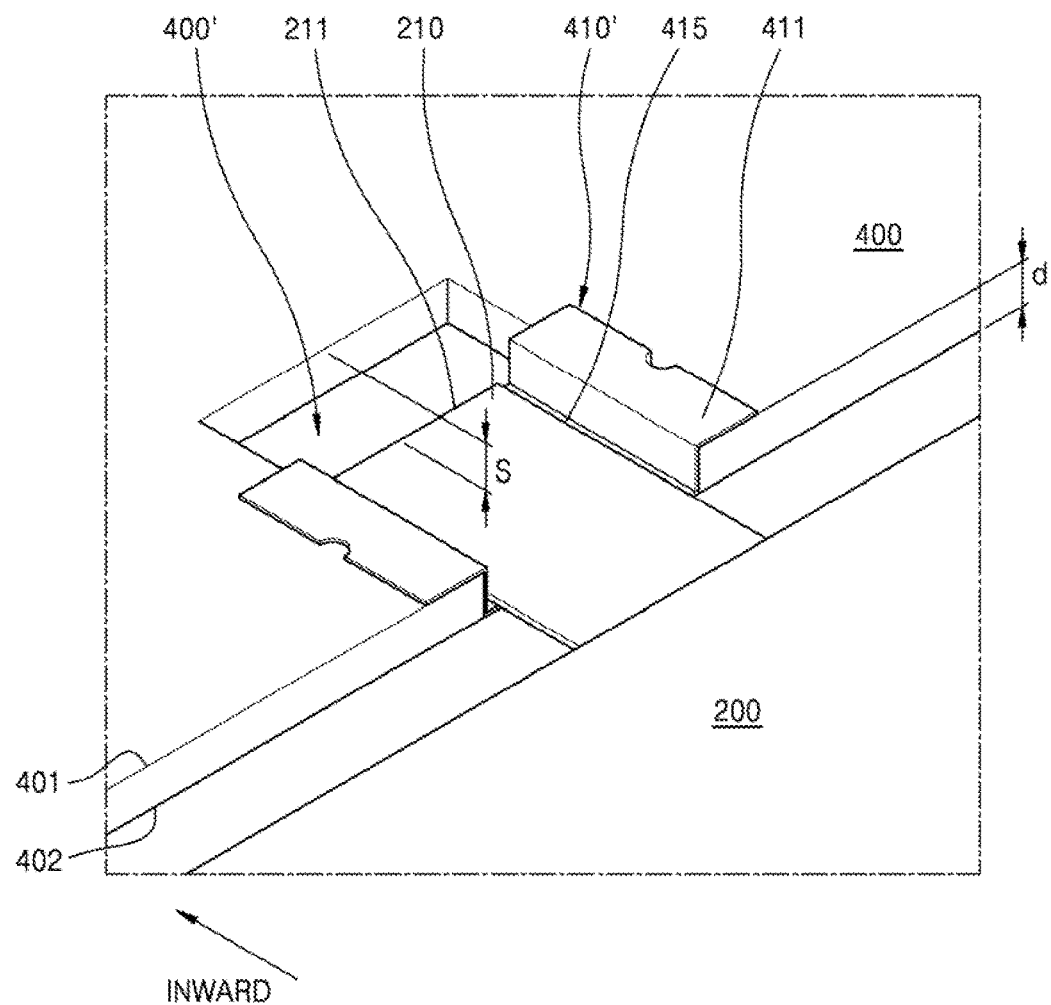

FIGS. 4A and 4B are views illustrating a connection structure between a battery cell 200 and a protective circuit module 400 according to another exemplary embodiment. Referring to FIGS. 4A and 4B, a connection tab 410' of the protective circuit module 400 may be placed across a connection slot 400' of the protective circuit module 400. In this embodiment, the connection tab 410' of the protective circuit module 400 may be inserted in the depth direction (d) of the connection slot 400'.

An electrode tab 210 of the battery cell 200 is placed on an upper surface of the connection tab 410' inserted in the depth direction (d) of the connection slot 400', and thus the electrode tab 210 of the battery cell 200 is placed in the connection slot 400'. That is, since the electrode tab 210 is placed in the connection slot 400', a gap S may be formed between the electrode tab 210 and a first surface 401 of the protective circuit module 400.

In some embodiments, the connection tab 410' may include wings 411 on both sides of the connection slot 400', and a support portion 415 between the wings 411 and bent from the wings 411 in the depth direction (d). Since the support portion 415 is lower than the wings 411 in the depth direction (d), the electrode tab 210 of the battery cell 200 placed on the support portion 415 is naturally separated from the first surface 401 of the protective circuit module 400 in the depth direction (d).

For example, the gap S may be properly formed in the depth direction (d) from the upper surface of the electrode tab 210 of the battery cell 200 to the first surface 401 of the protective circuit module 400. Owing to the gap S, the electrode tab 210 of the battery cell 200 may be properly separated from the first surface 401 of the protective circuit module 400 on which circuit patterns are formed, and thus a short circuit between the electrode tab 210 and the circuit patterns may be prevented or substantially prevented.

Figure 5A:
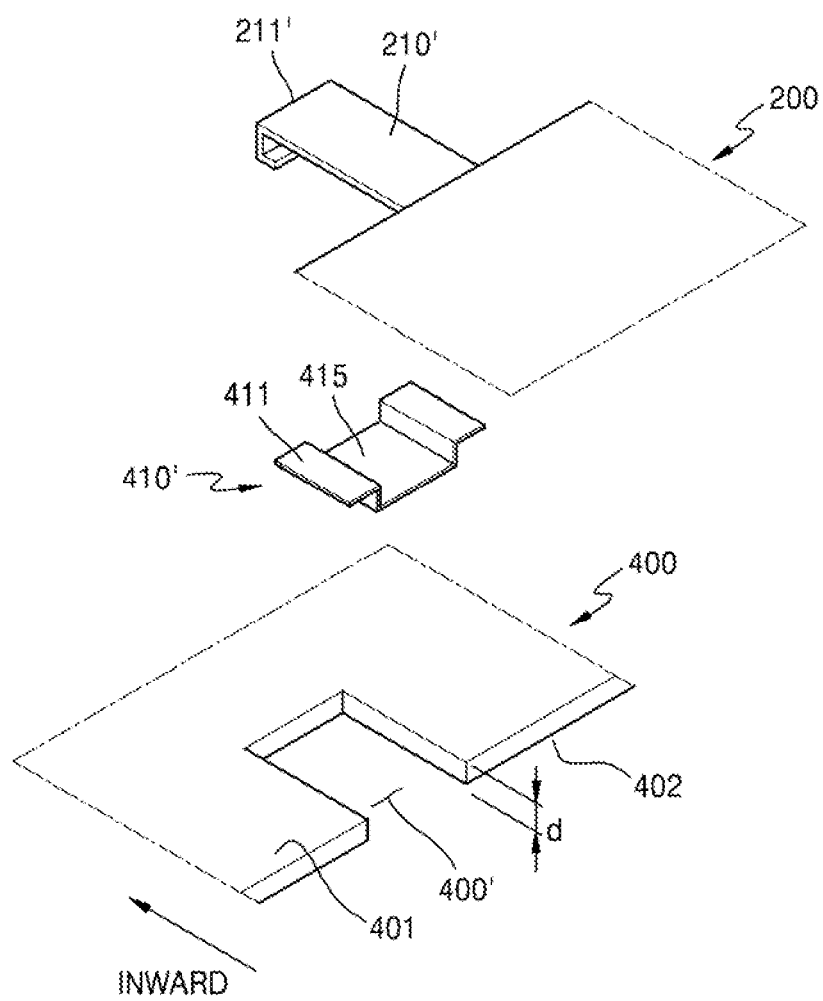
FIGS. 5A and 5B are views illustrating a connection structure between a battery cell and a protective circuit module according to another exemplary embodiment.
Figure 5B:
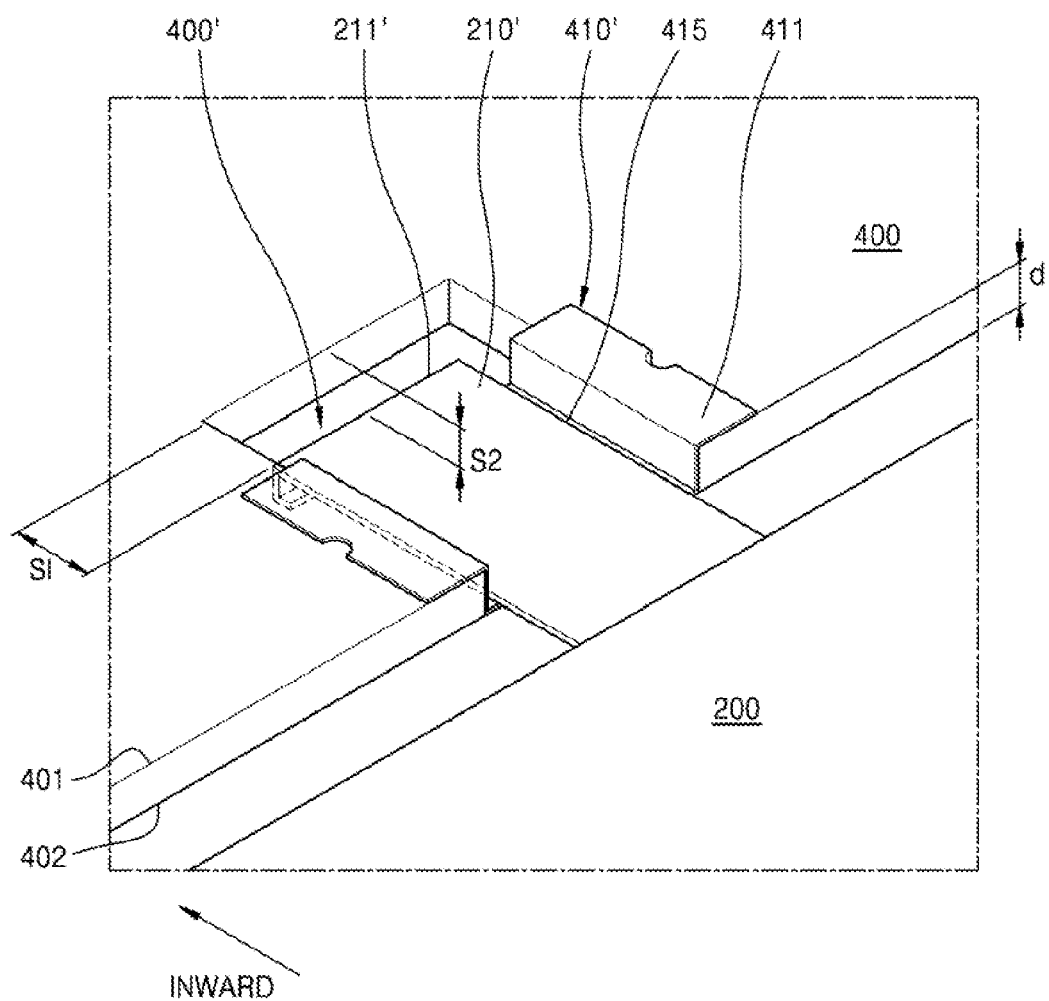

FIGS. 5A and 5B are views illustrating a connection structure between a battery cell 200 and a protective circuit module 400 according to another exemplary embodiment. Referring to FIGS. 5A and 5B, a connection tab 410' is placed across a connection slot 400' of the protective circuit module 400, and a portion of the connection tab 410' is inserted in a depth direction (d) of the connection slot 400'. Then, an electrode tab 210' of the battery cell 200 is welded to an upper surface of the connection tab 410'.

In this embodiment, the electrode tab 210' overlaps the upper surface of the connection tab 410' and is bent to surround an edge of the connection tab 410'. That is, a marginal portion of the electrode tab 210' may be bent, and a first gap S1 (as shown in FIG. 5B) may be formed between an innermost end portion 211' of the electrode tab 210' and a first surface 401 of the protective circuit module 400. In other words, the connection slot 400' of the protective circuit module 400 may extend further from the innermost end portion 211' of the electrode tab 210' into the protective circuit module 400, and the first gap S1 may be formed between the innermost end portion 211' of the electrode tab 210' and the first surface 401 of the protective circuit module 400.

In this case, since the marginal portion of the electrode tab 210' is bent, the electrode tab 210' may not extend excessively far (or relatively excessively far) into an inner side (or inner area) of the protective circuit module 400 and thus may not be short circuited with the protective circuit module 400. For example, the length of the electrode tab 210' may be strictly checked for preventing or substantially preventing a short circuit with the protective circuit module 400. In the current embodiment, however, since the marginal portion of the electrode tab 210' is bent, although the length of the electrode tab 210' may vary within a generous margin, the electrode tab 210' may still not be short circuited with the protective circuit module 400.

Referring to FIG. 5B, in addition to the first gap S1, a second gap S2 may be formed between the electrode tab 210' and the first surface 401 of the protective circuit module 400. The gap S2 is formed because a support portion 415 of the connection tab 410' is inserted in the depth direction (d) of the connection slot 400'. In some embodiments, because the electrode tab 210' is supported on the support portion 415 formed between a pair of wings 411 and inserted in the depth direction (d) of the connection slot 400', the gap S2 may be formed between the electrode tab 210' and the protective circuit module 400 in the depth direction (d).

As described above, according to the one or more of the above exemplary embodiments, the protective circuit module for electrically connecting the battery cells, for providing charging and discharging current passages, and/or for controlling charging and discharging operations is configured to have an improved connection structure, and thus a short circuit between the protective circuit module and the battery cells may be prevented or substantially prevented.

It should be understood that the exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims and their respective equivalents.

What is claimed is:

1. A battery pack comprising:
a battery cell comprising an electrode tab; and
a protective circuit module electrically connected to the electrode tab, the protective circuit module comprising a first surface configured to face the electrode tab and a second surface opposite the first surface,
wherein the electrode tab is separated from the first surface; and
wherein a connection tab is positioned across a connection slot of the protective circuit module, and the electrode tab is on an upper surface of the connection tab, and wherein an end portion of the electrode tab is bent through the connection slot to surround an edge of the connection tab.

2. The battery pack of claim 1, wherein the electrode tab is on and coupled to a surface of the connection tab facing the electrode tab.

3. The battery pack of claim 2, wherein the connection slot extends inward from an edge of the protective circuit module to a position away from the electrode tab.

4. The battery pack of claim 3, wherein the connection slot defines a gap between the first surface of the protective circuit module and the electrode tab.

5. The battery pack of claim 2, wherein the connection tab is bent in a depth direction of the connection slot.

6. The battery pack of claim 5, wherein the connection tab comprises:
wings on both sides of the connection tab and located at peripheral sides of the connection slot; and
a support between the wings and bent in the depth direction of the connection slot.

7. The battery pack of claim 6, wherein the support is at a position separated from the first surface of the protective circuit module in the depth direction of the connection slot, and wherein the electrode tab is placed on the support.

8. The battery pack of claim 1, wherein a bent portion of the electrode tab is an innermost portion of the electrode tab in a direction toward the interior of the protective circuit module, and the connection slot defines a gap between the bent portion of the electrode tab and the first surface of the protective circuit module.

* * * * *